United States Patent [19]
Oh

[11] Patent Number: 5,424,847
[45] Date of Patent: Jun. 13, 1995

[54] RECORDING AND REPRODUCING SYSTEM FOR DIGITAL VIDEO TAPE RECORDER FOR RECORDING VIDEO AND AURAL SIGNALS ON A COMMON TAPE TRACK

[75] Inventor: Young-nam Oh, Seoul, Rep. of Korea

[73] Assignee: Samsung Electronics Co., Ltd., Kyunggi-do, Rep. of Korea

[21] Appl. No.: 669,092

[22] Filed: Mar. 13, 1991

[30] Foreign Application Priority Data

Jul. 30, 1990 [KR] Rep. of Korea ............... 90-11611

[51] Int. Cl.⁶ ............................................. H04N 9/79
[52] U.S. Cl. ............................................. 358/310
[58] Field of Search ................. 358/310, 31, 343; 360/8, 32, 19.1; H04N 9/64, 9/79, 5/76

[56] References Cited

U.S. PATENT DOCUMENTS

| | | | |
|---|---|---|---|
| 4,682,248 | 7/1987 | Schwartz | 360/32 |
| 4,829,367 | 5/1989 | Dubois et al. | 358/31 |
| 4,843,485 | 6/1989 | Reitmeier | 358/310 |
| 4,914,527 | 4/1990 | Asai et al. | 360/19.1 |
| 5,062,004 | 10/1991 | Winterer et al. | 358/310 |
| 5,115,323 | 5/1992 | Tachibana et al. | 358/310 |
| 5,122,912 | 6/1992 | Kanota et al. | 360/46 |
| 5,200,834 | 4/1993 | Iwaibana et al. | 358/310 |
| 5,218,454 | 6/1993 | Nagawasa et al. | 358/343 |

Primary Examiner—Tommy P. Chin
Assistant Examiner—Thai Tran
Attorney, Agent, or Firm—Leydig, Voit & Mayer

[57] ABSTRACT

A recording and reproducing system for a digital VTR for home use, to record video and aural signals onto the same track of tape, by adding stereo aural signals to digital video component signals, and to reproduce digital component signals and stereo aural signals recorded on the same track of the tape by way of separation. The system includes an aural signal adder adding respective stereo aural signals that were converted to digital signals through A/D converters onto data which are transmitted from image encoder under compression, and error correction encoders generating data transmitted from the aural signal encoders by adding error correction bits, and an aural signal separator separating stereo aural data from data generated from error correction decoder, and a D/A converter for converting aural signal separator signals into analog signals. Because the system records both image signal and aural signal onto the same track and processes them by using digital bits, it provides superior playback image quality as well as no deteriorations of either image or aural qualities upon playback.

7 Claims, 2 Drawing Sheets

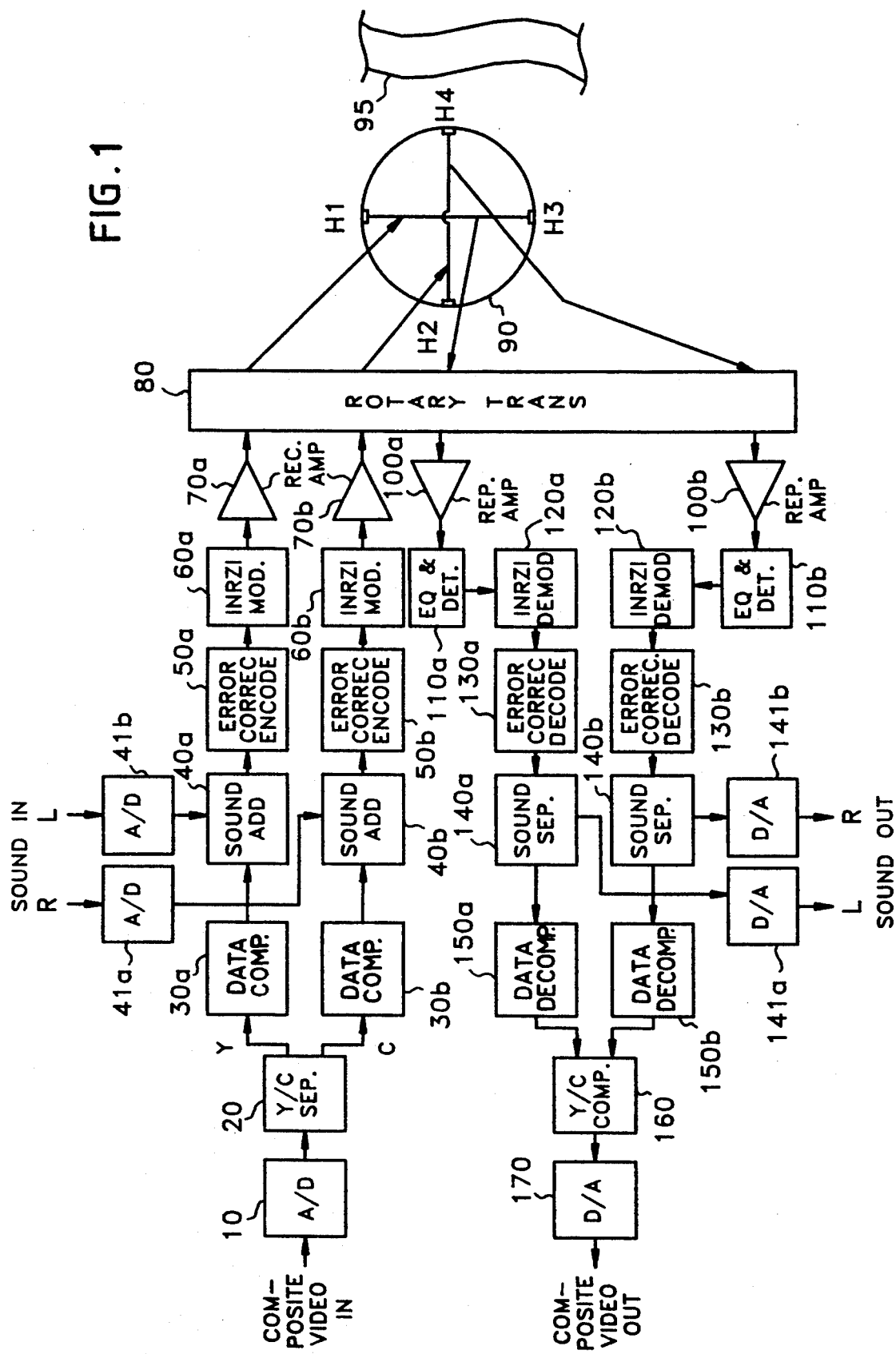

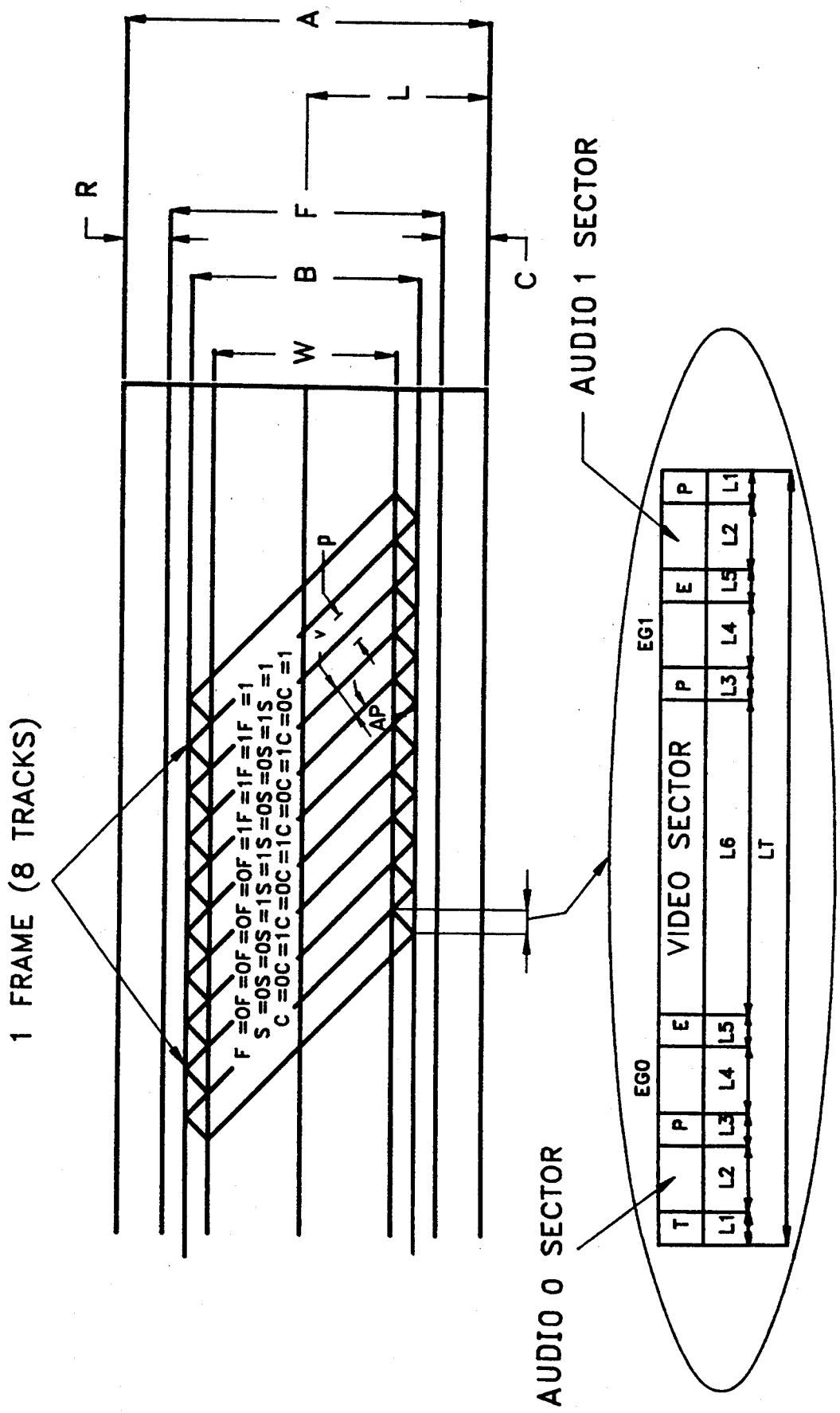

RECORDING AND REPRODUCING SYSTEM FOR DIGITAL VIDEO TAPE RECORDER FOR RECORDING VIDEO AND AURAL SIGNALS ON A COMMON TAPE TRACK

FIELD OF THE INVENTION

The present invention relates generally to a recording and reproducing system for a Digital Video Tape Recorder (hereinafter referred to as D-VTR) and more particularly, to a recording and reproducing system within a D-VTR for home use, to record onto the same track of tape, by adding stereo aural signals to digital component signals into which analog composite signals were converted, or to reproduce digital component signals and stereo aural signals recorded on the same track of the tape by way of separation.

BACKGROUND OF THE INVENTION

VTRs, currently in the process of development, put emphasis on long-used recording and reproducing technology of high pictorial image quality and high density recording, and the recording and reproducing system of a D-VTR is exceedingly superior to that of an Analog VTR in pictorial image quality or recording/play back aspects.

Meanwhile, in realizing the D-VTR for general purposes such as for home use, many technical features are desirable. For example, high density recording technology is used to lessen tape occupancy area per bit. Compression of data transmission amounts for reducing the amount of time needed to transmit a higher number of pictures to be recorded and an improved recording medium are also desired.

However, conventional D-VTRs present a problem in that as the recording density increases, the error occurrence frequency increases, and if the pictorial compression rate goes to excess, then pictorial image quality after play back is deteriorated.

In addition, the conventional D-VTR records stereo aural signals onto audio tracks of a tape in the form of analog signals, and that presents a problem in that the original stereo aural signal can never be reproduced.

SUMMARY OF THE INVENTION

Accordingly, an object of the present invention is to resolve the aforementioned problems and to provide a recording and reproducing system for D-VTR of which play back pictorial quality is excellent and without any deteriorations of pictorial image quality and tone quality, by way of recording stereo aural signals in addition to digital component signals which were converted from analog composite signals onto the same track on a tape of the same structure as the tape used in the conventional VHS type recording and reproducing system.

To achieve the above objects, the recording and reproducing system for digital video tape recorder of the present invention includes;

an analog/digital signal converter which converts NTSC composite pictorial image analog signals into digital signals;

a luminance/color signal separator which separates digital signals generated from the analog/digital signal converter into luminance signals and color signal;

first and second pictorial image data compressors for condensing transmission quantities of luminance signals and color signals both generated from the luminance/color signal separator at respective predetermined rates;

first and second means for processing stereo aural signals and the transmitted luminance and color signals thus generating composite signals to be recorded on the same track of a video tape, said first and second processing means being connected to said first and second data compressors;

means for applying the composite signal to a rotating head drum for recordation on a video tape;

means for reproducing the recorded stereo aural and image luminance and color signals from said video tape and converting the reproduced signals into electrical signals;

means for separating the aural signals from the image luminance and color signals;

first and second image data decompressors for extending transmission quantities of the luminance and color image signals at predetermined rates; and luminance/color synthesizer for combining luminance and color signals generated from the first and second data decompressors.

BRIEF DESCRIPTION OF THE DRAWINGS

These and other objects and advantages of the present invention will appear more clearly from the following detailed disclosure when read in conjunction with the accompanying drawings.

FIG. 1 is a systematic view of the recording and playback system for a D-VTR according to the present invention;

FIG. 2 is an enlarged view of format of a tape which is adapted to be used in the system shown in FIG. 1.

DETAILED DESCRIPTION OF THE INVENTION

Referring to FIG. 1, analog/digital signal converter 10 converts NTSC composite pictorial image signals input via the input terminal IN into digital data, also including a sampling frequency of 14.3 MHz and a quantizing beat of 8. For the A/D converter 10, the quantity of digital data transmitted to the luminance/color signal separator 20 is 114.4 Mbps.

The luminance/color signal separator 20 first processes composite pictorial image signals converted into digital data in the above A/D converter into luminance signal Y and color signal C each of component type by using separate channels, and then, causes the respective signals to be recorded onto tape 95.

The digital data generated from the separator 20 varies in Mbps up to 114.4 Mbps in transmission, which is too much data to be recorded onto tape 95.

Therefore, first and second pictorial image encoders 30a, 30b compress the transmission quantities of digital data generated from the luminance/color signal separator 20 into one eighth of the original capacity and then transmit that data to first and second aural signal adders 40a, 40b, respectively. Namely, the first and second pictorial image encoders 30a, 30b utilize the interrelation between pictorial image signals, respectively, so that picture quality is not affected during playback and decoding process, respectively. Meanwhile, R and L channel stereo aural signals are converted into digital signals through the respective A/D converters 41a and 41b, and next, added to data that was condensed in first and second image encoders 30a, 30b through their respective first and second aural signal adders 40a, 40b, and then, transmitted to first and second error correction encoders 50a, 50b.

The first and second error correction encoders 50a and 50b add coded data for error correction to correct data errors which might have occurred during recording/playback onto the data having 15 Mbps quantities transmitted from the first and second aural signal adders 40a and 40b. At this time, the data amount generated from the first and second error correction encoders 50a and 50b amounts to 20 Mbps.

The data to which error correction code data is added at the respective first and second error correction encoders 50a and 50b are supplied to first and second modulators 60a and 60b, respectively, to be processed by Interleaved Non-Return to Zero Inverting ( INRZI ) modulation which causes no changes in data amount even after completion of modulation.

The data which has been processed by INRZI modulation method as stated above is generated from the first and second modulators 60a and 60b, respectively, is output to the first and second record amplifiers 70a and 70b and rotary transformer 80, respectively, to be recorded on tape 95 by respective magnetic heads H1,H2, H3 and H4 each attached to head drum 90.

Inversely, in order to reproduce the data recorded on the tape 95, the data are converted into electrical signals by using magnetic heads H1, H2, H3 and H4 attached to head drum 90, and thereafter, are applied to rotary transformer 80.

The rotary transformer 80 transmits the applied electrical signals to first and second playback amplifiers 100a and 100b, respectively, so that the signals are amplified.

First and second equalizing detectors 110a and 110b to which the second channel signals amplified in the first and second playback amplifiers 100a and 100b are applied, respectively, compensate signal attenuations to standardize, and detect data previously standardized.

Meanwhile, first and second demodulators 120a and 120b demodulate the modulated signals generated from the first and second equalizing and detectors 110a and 110b by using INRZI demodulating method, and thereafter, transmit to first and second error correction decoder 130a and 130b, respectively. The first and second error correction decoders 130a and 130b eliminate error correction bit of 5 Mbps among signals transmitted from first and second demodulators 120a and 120b and output to first and second aural signal separators 140a and 140b, respectively.

The first and second aural signal separators 140a and 140b separate stereo aural signals L,R and transmit image signals to first and second image decoders 150a and 150b which both expand the image signal transmission capacity eight times, respectively.

The stereo aural signals of R and L channels which were separated by the first and second aural signal separators 140a, 140b, respectively, are converted into analog signals through their respective D/A converters 14a and 14b to be output.

The two channel signals of both luminance signal and color signal of which transmission capacities are expanded by eight times at the respective first and second image decoder 150a, 150b are firstly combined together at luminance/color signal synthersizer 160, and next converted into analog signals in digital/analog signal converter 170, and then applied to an output terminal OUT.

In a recording and reproducing system of D-VTR according to the present invention, the apparatus for driving the head drum 90 is composed so as to adopt a conventional VHS type apparatus of half inch per sec, and is of 2 channel-4 head recording type by allotting 2 heads per channel.

In addition, in a recording and playback system for DVTR according to the present invention, the recording data rate is 20 Mbps per channel as stated above and maximum recording frequency is 10 MHZ, and the velocity of head drum 90 is to be rotated at 3600 rpm since high frequency recording is impossible at a relative velocity such as that of VHS type.

Meanwhile, data which can be recorded onto tape 95 by using a recording and playback system for D-VTR according to the present invention are up to 8 tracks per frame so that data per frame is 1.33 Mbps while data per track is 0.167 Mbps. Further, the diameter of head drum 90 and lead angle thereof are 62 mm and 5.935' which are the same as those of VHS type systems.

In such a case, the track length becomes 97.389 mm, and when the velocity of the tape 95 reaches the speed of 33.35 pk mm/sec as is the same as that of a VHS type system at which the velocity of head drum 90 doubles in speed, the relative speed becomes about 11.65 m/sec.

Accordingly, a recording and playback system for D-VTR according to the present invention, because the relative velocity of head drum 90 is remarkably faster than that of VHS type, can record and/or reproduce even a 10 MHZ high frequency signal, where the effective lead angle of tape 95 during running is 5.952'.

In addition, the real length of the track is 97.1129 mm, and the track's angle becomes larger by influence of the velocity of tape 95, compared with the angle taken during stop.

The tape 95 runs at the rate of 8×30=240 tracks per second and, since its velocity is 33.35 mm/s, the gap between tracks is about 14.4 mm wide, which results in a very small region for one bit.

The shortest recording wavelength to record maximum frequency of the above stated 10 MHz becomes, because its relative velocity is about 11.65 μm/sec, about 1.165 μm by applying an equation of $\lambda = Vr/f$ thereto, and the recording density of which is 1.7 bit per 1 μm and the recording area of one bit is about 8.4 μm.

FIG.2 is an enlarged view illustrating the format of tape 95 according to FIG. 1. Referring to FIG. 2, data arrangement per track LT is such that track preamble T, and audio O sector, post-amble P, edit gap EGO, in-track preamble E, video sector, post-amble P, edit gap EG 1, in-track preamble E, audio 1 sector and post-amble P are settled in order.

Measurements of tracks within tape 95 is shown both in Table 1 and Table 2.

TABLE 1

| | | | |
|---|---|---|---|
| LT | 97.1129 | L4 | 0.8504 |
| L1 | 0.3563 | L5 | 0.1609 |
| L2 | 9.8262 | L6 | 74.6553 |
| L3 | 0.0345 | | |

TABLE 2

| | | | |
|---|---|---|---|
| A | 12.65 | V | 0.0144 |
| P | 0.0144 | C | 0.75 |
| B | 10.60 | R | 1.0 |
| W | 10.07 | AP | 5° 57' |
| L | 6.2 | OV | 28% |

The eight tracks of video 1 frame of tape 95 are sectioned into field ID (F), segment ID (S) and track ID (C), respectively, and the upper part of video track is composed of time code track for editing, while the lower part is composed of control track.

Each measurement of the Table 2 above shows tape width A, the full width of video B, control track width C, audio track width R, video width W, real track width v, post amble P, tape standard height L, overlap capacity OV and video track angle AP during running of each of conventional VHS type, respectively. Here, $OV = 100(H-V)/H$ As stated above, the present invention can be embodied in a highly efficient D-VTR by using a tape having the same structure as that of the conventional VHS type. Namely, because both image signal and aural signal are recorded onto the same track to then be processed in digital, the present invention has advantages of having superior playback image quality and no image quality and sound quality deteriorations.

In addition, as aural signals are recorded onto image signal tracks, other additional signals such as editorial control signals or time codes can possibly be recorded onto the upper side of the tape onto which conventional aural signals are recorded so that total recording informations are increased.

The above description is given on prefered embodiments of the present invention but it will be apparent that many modifications and variations could be effected by a person skilled in the art without departing from the true sprit or scope of the novel concepts of the invention so that the scope of the invention should be determined by the appended claims only.

What is claimed is:

1. A recording and reproducing system for a digital video tape recorder comprising:

first analog/digital signals converter for converting composite image analog signals into digital component signals;

luminance/color signal separator which separates digital signals generated from said first analog/digital signal converter into luminance signals and color signals;

first and second image data compressors for condensing transmission amounts of both luminance signals and color signals generated from said luminance/color signal separator at the respective rates;

first and second means for processing stereo aural signals and the transmitted luminance and color signals thus generating composite signals to be recorded on a same track of a video tape, said first and second processing means being connected to said first and second data compressors respectively;

means for applying the composite signal to a rotating head drum for recordation on a video tape;

means for reproducing the recorded stereo aural and image luminance and color signals from said video tape and converting the reproduced signals into electrical signals;

means for separating the aural signals from the image luminance and color signals;

first and second image data decompressors for extending transmission quantities of the luminance and color image signals at predetermined rates; and a luminance/color synthesizer for combining luminance and color signals generated from said first and second data decompressors.

2. A recording and reproducing system for a digital video recorder according to claim 1, wherein said means for applying the processed signal includes first and second error correction encoders for adding error correction bits to data transmitted from said means for processing stereo aural signals.

3. A recording and reproducing apparatus according to claim 2, further comprising first and second modulators for modulating data generated from the first and second error correction encoders.

4. A recording and reproducing apparatus according to claim 3, further comprising first and second recording amplifiers for amplifying the modulated data.

5. A recording and reproducing system for a digital video recorder according to claim 1, wherein said first and second data compressors condense transmission quantities of luminance signals and color signals to one eighth of their original capacity, respectively.

6. A recording and reproducing system for a digital video tape recorder according to claim 1, wherein said first and second modulators modulate using INRZI method so as to prevent data from being reduced after completion of modulation.

7. A recording and reproducing apparatus according to claim 1 wherein said means for processing includes an analog to digital converter for converting an analog stereo aural signal into a digital stereo signal and an adder for adding the stereo signal to the signal output from one of said compressors.

* * * * *